United States Patent [19]

Podini

[11] Patent Number: 4,939,891
[45] Date of Patent: Jul. 10, 1990

[54] AUTOMATIC BALER FOR BUNDLING TOGETHER INDIVIDUAL FOOD BAGS PREVIOUSLY FILLED IN AUTOMATIC PACKERS

[76] Inventor: Piergiorgio Podini, P.O. Box 62.149, Caracas 1060-A, Venezuela

[21] Appl. No.: 279,346

[22] Filed: Dec. 1, 1988

[51] Int. Cl.$^5$ .................. B65B 5/10; B65B 35/50; B65B 57/10
[52] U.S. Cl. .................................. 53/496; 53/247; 53/500; 53/537; 53/540; 414/791.6; 414/794.2; 414/794.4; 414/794.7
[58] Field of Search .............. 53/247, 258, 496, 497, 53/498, 499, 500, 493, 537, 540, 543; 414/791.6, 794.2, 794.4, 794.7

[56] References Cited

U.S. PATENT DOCUMENTS

| | | | |
|---|---|---|---|
| 2,549,004 | 4/1951 | Pomeroy et al. | 53/496 |
| 3,566,576 | 3/1971 | Ayres et al. | 53/540 |
| 3,865,258 | 2/1975 | Müller | 414/794.7 X |
| 3,908,539 | 9/1975 | O'Brien | 53/540 X |
| 4,137,604 | 2/1979 | Sandberg et al. | 53/500 X |
| 4,173,910 | 11/1979 | Lineberry et al. | 414/794.7 X |

Primary Examiner—Robert L. Spruill
Assistant Examiner—Johnson: Linda B.
Attorney, Agent, or Firm—Gunn, Lee & Miller

[57] ABSTRACT

An automatic baler for bundling together small, individual food bags that have been previously formed and filled in automatic packers, designed to be arranged in line with the outlet of a packer machine with individual bags sequentially transferred by a moveable piston onto the top of a stacking hopper and arranged firstly in layers of several bags disposed side by side, and secondly to be stacked by superimposing every layer over another, and finally to introduce, again by way of a moveable piston, the stack of layers thus made into a larger bag or box attached to an open mouth of the stacking hopper, allowing in this way a plurality of individual packages to be placed in a condition for ease of handling.

2 Claims, 6 Drawing Sheets

AUTOMATIC BALER FOR BUNDLING TOGETHER INDIVIDUAL FOOD BAGS PREVIOUSLY FILLED IN AUTOMATIC PACKERS

BACKGROUND OF THE INVENTION

1. Field of the Invention

The present invention is related to an automatic baler for bundling together packages previously filled, closed and sealed in a packer machine, of the type which inserts severaly of such packages into a bigger container to facilitate their handling, storage and transportation.

2. Prior Art

It is a common practice in the food industry to pack in plastic bags or cardboard boxes predeterminate amounts of some goods, such as rice, spaghettis, etc., for their retail trade. In this way the products reach the consumers in containers that are both attractive and practical, facilitating their handling and guarantying that the goods are kept in healthy conditions.

However, to handle those containers, usually having very small sizes, requires repetitive operations that being bothersome affect negatively production costs and labor. Therefore, to facilitate the handling, storage and transportation of this kind of packages it has become a practice in a the industry to form bales or similars integrated by several small packages by inserting them into bigger plastic bags, carborad boxes or similars them into bigger plastic bags, cardboard boxes or similars in order to manipulate pluralities of them as a unit, overcoming so the above mentioned difficulties.

The insertion of the small packages into bigger containers is made either manually or by means of specially designed machines. Is in relation to this type of machinery that this invention is related.

SUMMARY OF THE INVENTION

Applicant has invented an automatic baler for bundling together small and individual food bags that have been previously formed and filled in automatic packers. A specific object of the present invention is to provide an automatic baler designed to be arranged lined up with the outlet of a packer machine so that the small bags or packages already formed, filled, closed and sealed in the packer are transferred sequentially into the automatic baler to arrange them firstly in layers of several of such packages or bags disposed side by side, to later form a stack superimposing every such layer over each other and to finally introduce the stack of layers thus made into a bigger plastic bag or cardboard box, allowing in this way that a plurality of small and individual packages be in a condition for its manipulation with relative easiness as a whole, overcoming the problems encountered in the prior art.

Another object of this invention is to provide additional means by means of which the stopping of the baler during the stage of stacking every layer of individual packages is avoided, whereupon the efficiency of the automatic baler is improved.

These and others objects and advantages of the present invention will be apparent to those skilled in the art from the following specification and claims, when interpreted jointly with the annexed drawings, with such specification being given only as example of the embodiments which can be obtained and in no way in a limitative form.

In the drawings every part or piece will be identified by means of a reference number or a combination of numerals and letters which always would be used to designate the same parts appearing in the various views of the drawings.

BRIEF DESCRIPTION OF THE DRAWINGS

FIGS. 7, 8 and 9 are longitudinal sections taken along line 7—7 in FIG. 4, showing different and successive stages in the forming of a bale with a plurality of packages, from the conformation of the layers of several packages, to their stacking and final insertion of the bale into a plastic bag or similar.

DEATILED DESCRIPTION OF A PREFERRED EMBODIMENT OF THE INVENTION

Figure 1:
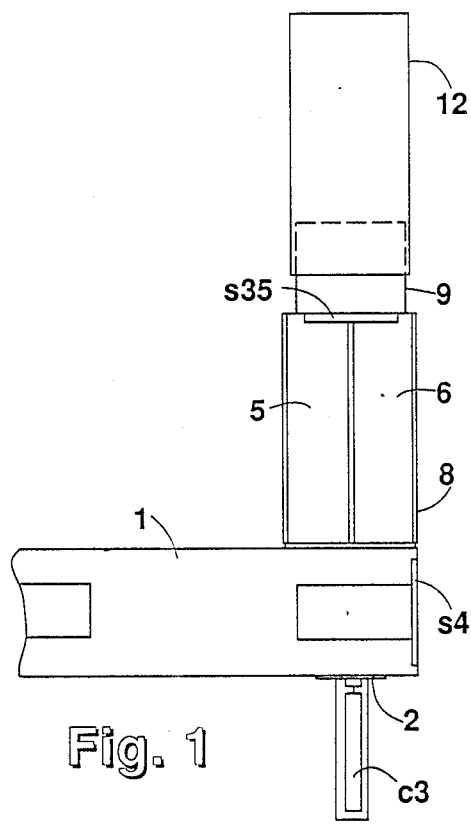
FIGS. 1 to 4 are schematic view of an automatic baler for bundling together individual food bags, made in accordance with this invention, showing successive stages of its operation.
Figure 2:
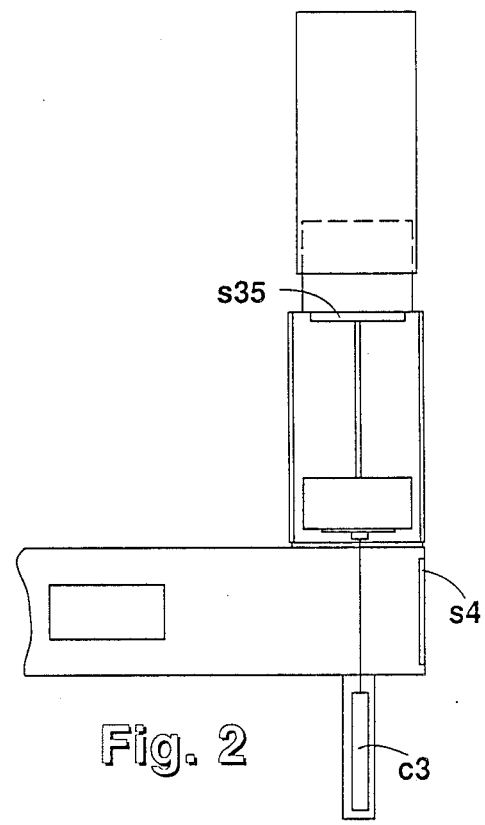
Figure 3:
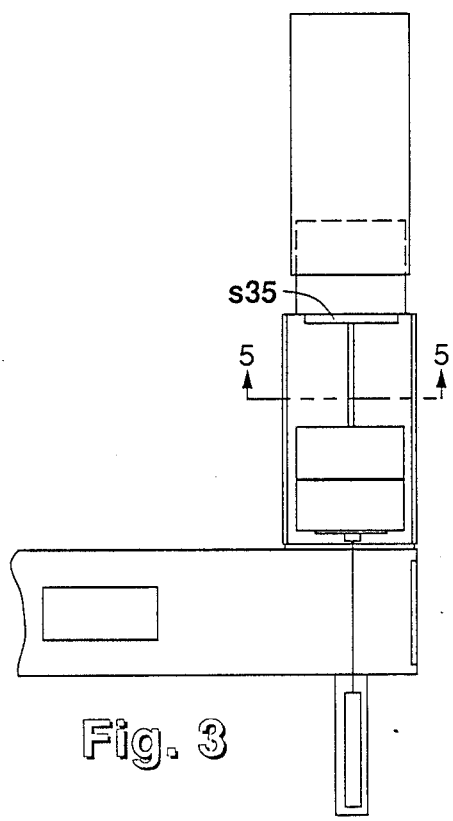
Figure 4:
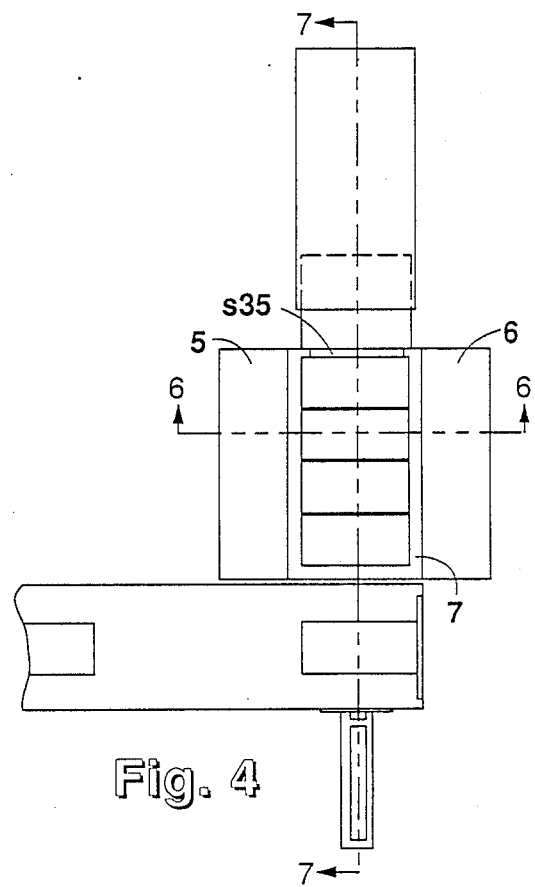

As is evident from the drawings the automatic baler of the invention herein disclosed for bundling together small individual food bags or similars, of the kind that have been previously formed, filled, closed and sealed in a known packer machine, is disposed in operative association with such a packer machine in order that every package there made is in any known way transferred to an endless conveyor 1, which constitutes its inlet, to be conveyed sequentially to a first station 2. The station 2 comprises a pneumatic cylinder c3 and a sensor S4. The packages on arriving individually to the station 2 are stop in their path by the sensor S4 which on detecting them will activate the cylinder c3 so that its piston will push perpendicular to the longitudinal axis of the conveyor 1 the package which presence has been detected at the moment over the station 2, pushing it laterally toward the proximal end of station 8, upon which the piston of cylinder c3 is retrieved to its original position, as shown in FIG. 1. When sensor S4 detects the arrival of the next package to the station 2 it activates again said cylinder c3 so that it will push laterally this second package toward the proximal end of station 8, but as already there is in there the first package previously pushed to that position, the latter will be consequently pushed inwardly in order that the arriving one will remain at the proximal end of the station 8. The repetitive action of cylinder c3 will cause that at any given moment the surface of station 8 will be occupied by a predeterminate number of individual packages disposed in there side by side, as shown in FIG. 4. Although in this FIG. 4 there are four packages shown forming a group or layer of packages on the surface of station 8, it would be evident that the number of packages that could be disposed in said station at any given moment to constitute a group or layer of packages could vary depending upon several variables, such as sizes of packages, area of the station 8, etc. The packages clustered together side by side upon station 8 will constitute a layer of the final bale to be formed, as follows.

Figure 5:
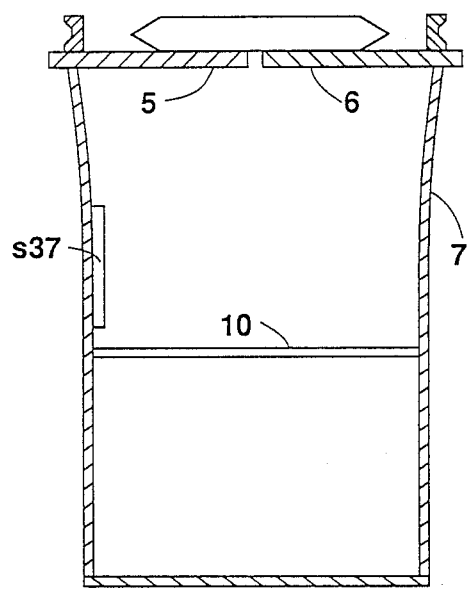
FIGS. 5 and 6 are cross sectional views taken along line 5—5 in FIG. 3, with FIG. 6 showing opposite lateral displacement of two sliding leaves that together constitute the upper part of a stacking hopper.
Figure 6:
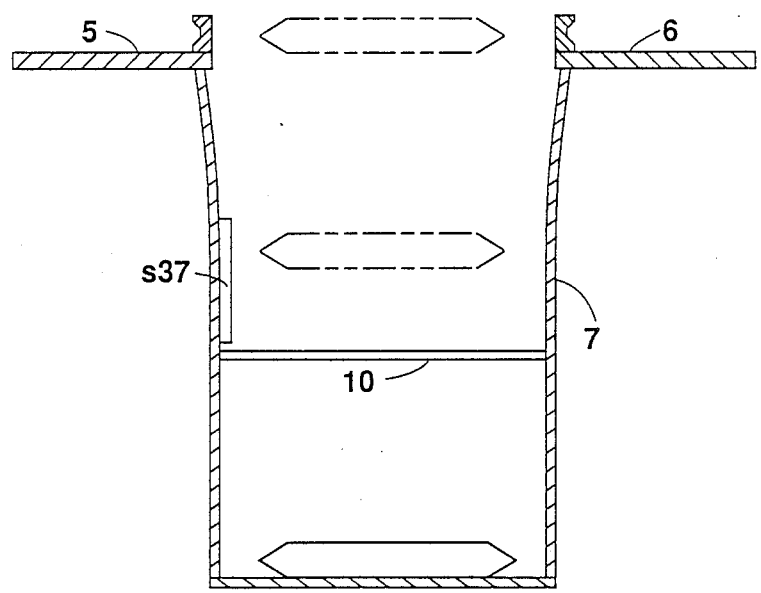

Once a layer of juxtaposed packages has been grouped upon the station 8 a sensor S35 therein associated will determinate that the surface of said station 8 be opened to allow the layer of packages to drop freely downwardly to the bottom of a stacking hopper 7. This is possible because the surface of the station 8, in this embodiment, which at the same time slidingly covers the upper side of the stacking hopper 7 is split in two sliding leaves 5 and 6, disposed therein in any known way so that they can be opened every time that a layer of packages has been clustered on its surface. Of course, the sliding leaves 5 and 6 could be disposed in any other arrangements, such as for instance installing tilting or swinging leaves or by using laterally sliding leaves as those shown in FIGS. 5 and 6 but including additionally within the hopper 7 a means being vertically displaceable in staggered fashion in order to receive in a flat surface every dropping layer of packages with a minimum falling distance, with the staggering mechanism lowering the flat surface to make room for every next layer of packages. This latter arrangement could be very useful when handling certain fragil products which could result damaged during a larger fall.

Figure 7:
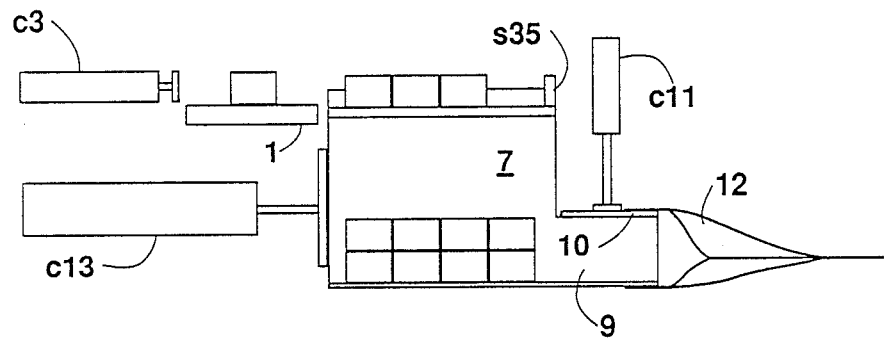
Figure 8:
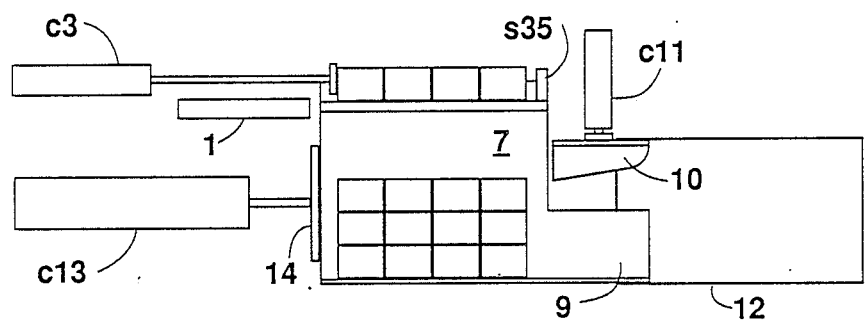
Figure 9:
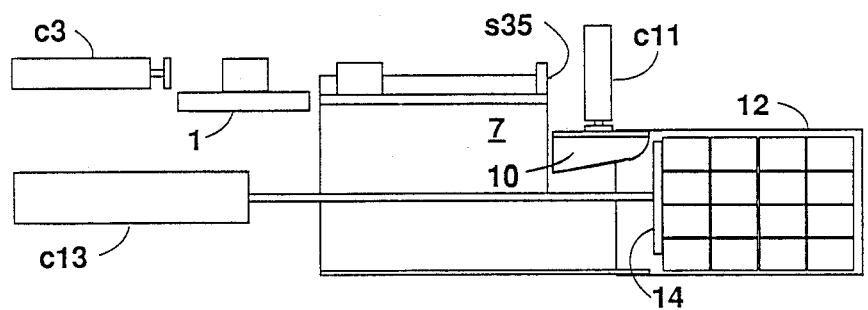

The stacking hopper 7 is a parallelepiped-like box with its frontal and rear sides being free, the upper one being covered by the sliding split leaves 5 and 6 and the lateral sides being flared at their upper ends to facilitate the downward displacement of the packages during stacking stage of the layers of packages. In the free rear side of the hopper 7 there is associated a bag opener comprised by an extension 9 of the hopper of similar shape with free communication between them having also its rear side free, and an opener means having a flat surface 10 that covers the upper side of this extension 9 in vertical removable fashion drvien by a pneumatic cylinder c11. When the piston of cylinder c11 is extended it will maintain the opener 10 resting upon the upper free side of the extension 9, as seen in FIG. 7. Is in this moment that an operator can proceed to install a bag 12 in such a way that its mouth surrounds all sides of the extension 9. When the operator activates the cylinder c11 causing that its piston be retrieved it will raise the flat surface 10 therein associated, consequently displaying the mouth of the bag 12 to its open condition, as shown particularly in FIG. 8, readying it to receive the stacking of layers integrated by individual packages.

Once the desired number of layers of packages has been piled within the stacking hopper 7, a sensor S37 therein associated will activate a pneumatic cylinder c13 which has a flat pusher 14 perpendicularly associated at the distal end of its piston with its piston being moveable in a path longitudinal to the hopper 7 in order to push in skidding fashion the stack of layers toward the interior of the bag 12 the piston of cylinder c13 is automatically retrieved and the operator will proceed to remove and closed or sealed the mouth of the bag 12 in any known manner. The cylinder c11 is concurrently activated so that the flat surface 10 descends to its position resting upon the upper side of the extension 9 readying it to receive a new bag 12, as shown in FIG. 7.

Figure 13:
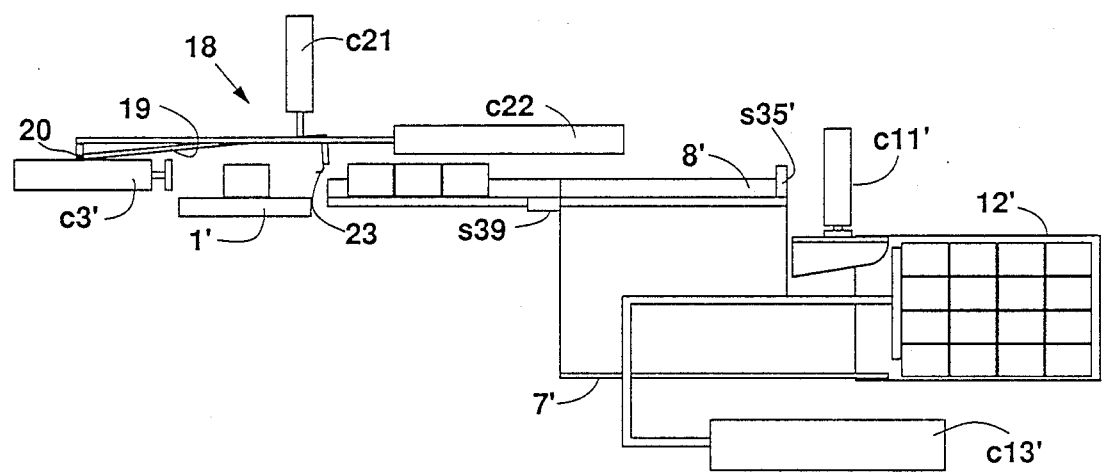

The cylinder c13 alternatively can be disposed underneath the hopper 7, as seen in FIG. 13 having its piston divided in three sections, two of them being parallel and of equal length, one of it being the piston itself and the other having its distal end associated to the flat pusher 14. Any known segment joins them in any known relationship disposed freely slideable thru a central and longitudinal slot made in the bottom side of the hopper 7. With this arrangement the piston will have a shorter stroke and the bale pusher will occupy lesser space.

DETAILED DESCRIPTION OF ALTERNATIVE EMBODIMENTS OF THE INVENTION

Reference being made to FIGS. 10 to 13 it is observed that the individual packages previously formed, filled and closed or sealed in a packer machine are fed to the endless conveyor 1' which takes them to station 2' from which in the manner described in the preferred embodiment of the invention they are individually pushed laterally toward an intermediate station 17 constituted by a surface disposed in coplanar relationship between said endless conveyor 1' and a further station 8' which in splitting and sliding relationship covers the upper side of the hopper 7'. In this intermediate station 17 the packages coming from the endless conveyor 1' are clustered together side by side in the manner described in the preferred embodiment until a predeterminate number of them are grouped to configurate a layer of packages to be let dropped into the stacking hopper 7'. When said predeterminate number of packages are disposed upon the intermediate station 17 a sensor S39 therein associated will activate a displacer means 18 which by means of its articulated type arm 19 will push the group or layer of packages so formed toward the station 8'. A sensor S35 existing in association with station 8' when detecting the presence of the group of packages constituting a layer of packages in its surface will activate a means to laterally slidingly move in opposite directions a couple of sliding leaves 5' and 6' which jointly form said surface of the station 8'. The layer of packages will consequently drop into the bottom of a stacking hopper 7', in the same manner described for the preferred embodiment of this invention. The stacking hopper 7' has in operative association a bale pusher integrated by a pneumatic cylinder c13' and a pusher 14', to laterally push a bale formed inside the hopper 7' toward a bag 12'. Also there is assocaited to the hopper 7' a bag opener 10' having a pneumatic cylinder c11'.

In the preferred embodiment above described when a group of packages have been clustered together in station 8 and s sensor S35 determinates that the sliding leaves 5 and 6 be opened to allow the layer so formed to drop into the hopper 7, it is necessary to avoid the arrival of further packages to said station 2, because they would either unduly accumulate in there or would be laterally push toward the station 8, which being at the moment opened, would allow them to drop into it, what is undesirable as it would perturb the orderly conformation of the bale. This stopping could even required, in some instances, holding back the production of the packer machine.

The intermediate station 17 and the displacer means 18 are designed to allow that operation of the baler of this invention be effected in a continuous basis, without any stopping stages.

Figure 10:
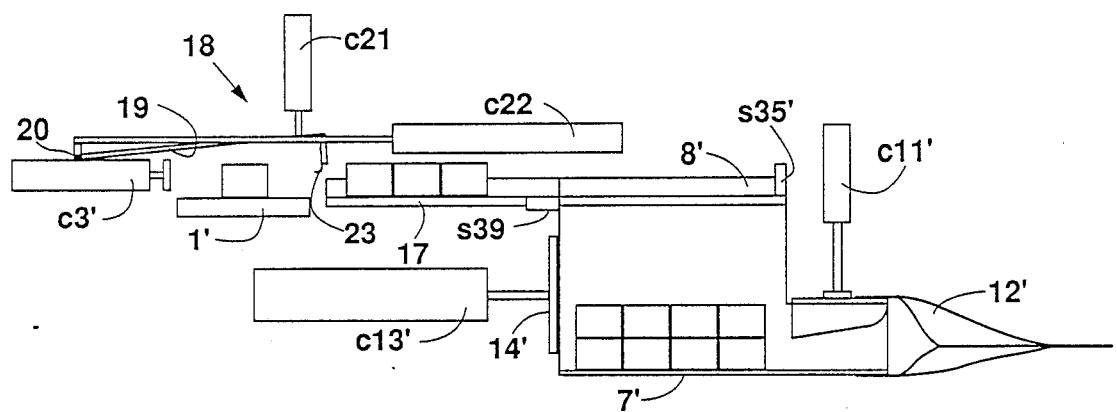
FIGS. 10 to 13 are views similars to FIGS. 7-9 showing, however, an alternative embodiment of the invention.
Figure 11:
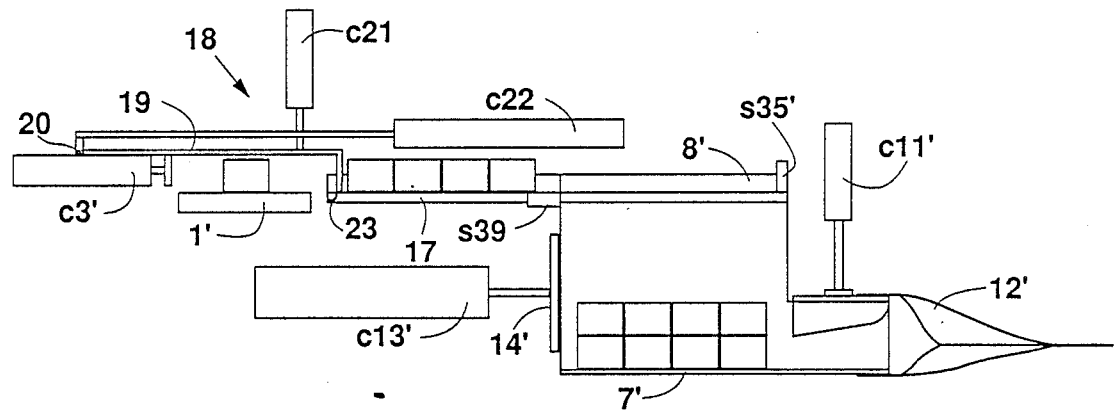
Figure 12:
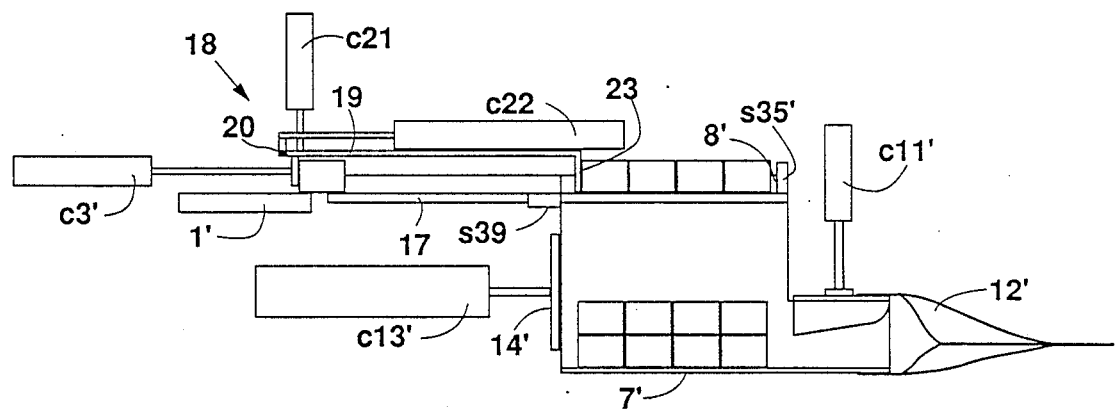

Again with reference to FIGS. 10 to 13 when the sensor S39 associated to intermediate station 17 detects that the predeterminate amount of packages have been clustered in it the displacer means 18 will be activated and the layer so formed will be pushed laterally toward station 8'. While the layer of packages are being displaced toward station 8' from station 17 the individual packages coming from the packer machine upon the endless conveyor 1' are continously fed uninterrupted to station 2', pushed laterally from there to intermediate station 17 to integrate a new layer of packages to be later let drop into the stacking hopper 7'. In this way the operation of the baler of this invention is in a continous basis. The displacer means 18 is integrated by an articulate type arm 19 basculeable in 20 and in operative association at its front end with the piston of a pneumatic cylinder c21 in order to be able to bascule between a lowered position, as seen in FIGS. 11 and 12, and an upper position, as seen in FIGS. 10 and 13. The articulate type arm 19 is disposed in association with guide means (not shown) in sliding relationship, with the guide means located upon or near the station 2' in such a way that the passage of individual packages being conveyed by the endless conveyor 1' is not hindered and at the same time allowing that the articulated arm 19 be laterally displaceable to push the layer of packages formed in the intermediate station 17. This lateral movement of the arm 19 is effected upon retrieving of the piston of pneumatic cylinder c22 when the sensor associated with intermediate station 17 detects the forming of a layer of packages and once that it has previously caused that cylinder c21 lowers the arm 19 to its lower position shown in FIG. 11. The lateral movement of the arm 19 will cause that the layer of packages clustered in station 17 be pushed in skidding fashion toward station 8' for which action the proximal end of arm 19 is equped with a flat pusher 23 perpendicular disposed therein in order that it will face side by side the lateral side of the package standing on proximal end of station 17 to push all of the packages integrating it until the layer reaches next station 8'. In FIGS. 11 and 12 it is seen that the arm 19 has been lowered and its flat pusher 23 is facing the lateral side of the first package of the layer, while another individual package is arriving to station 2' upon the endless conveyor 1'. In FIG. 12, the arm 19 and its pusher 23 have been laterally move toward the right of the observer pushing all the packages of the layer to the next station 8' while at the same time the next package arrived to station 2' is being pushed laterally into intermediate station 17. When returning to its original position of FIG. 11 the arm will be previously or concurrently lifted to its upper position so that its flat pusher 23 will not hinder the passage of the packages now being clustered upon the surface of the intermediate station 17.

Figure 14:
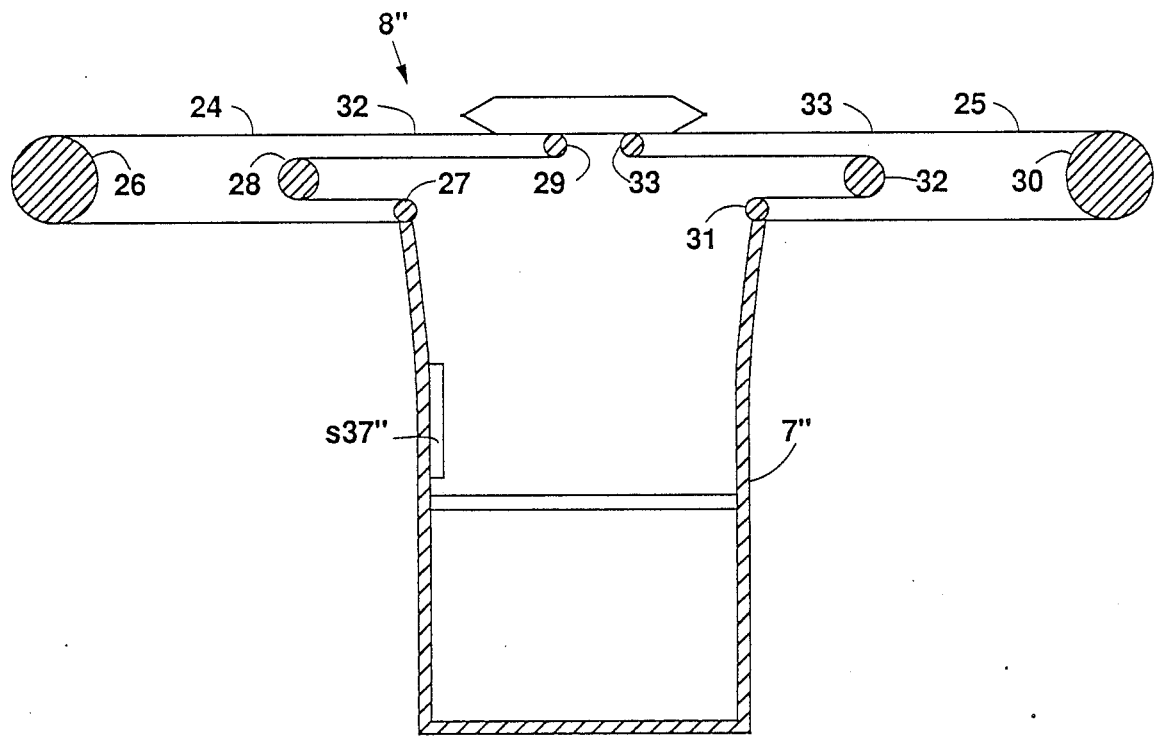
FIGS. 14 and 15 are views similars to FIGS. 5 and 6 showing another alternative embodiment of the invention.
Figure 15:
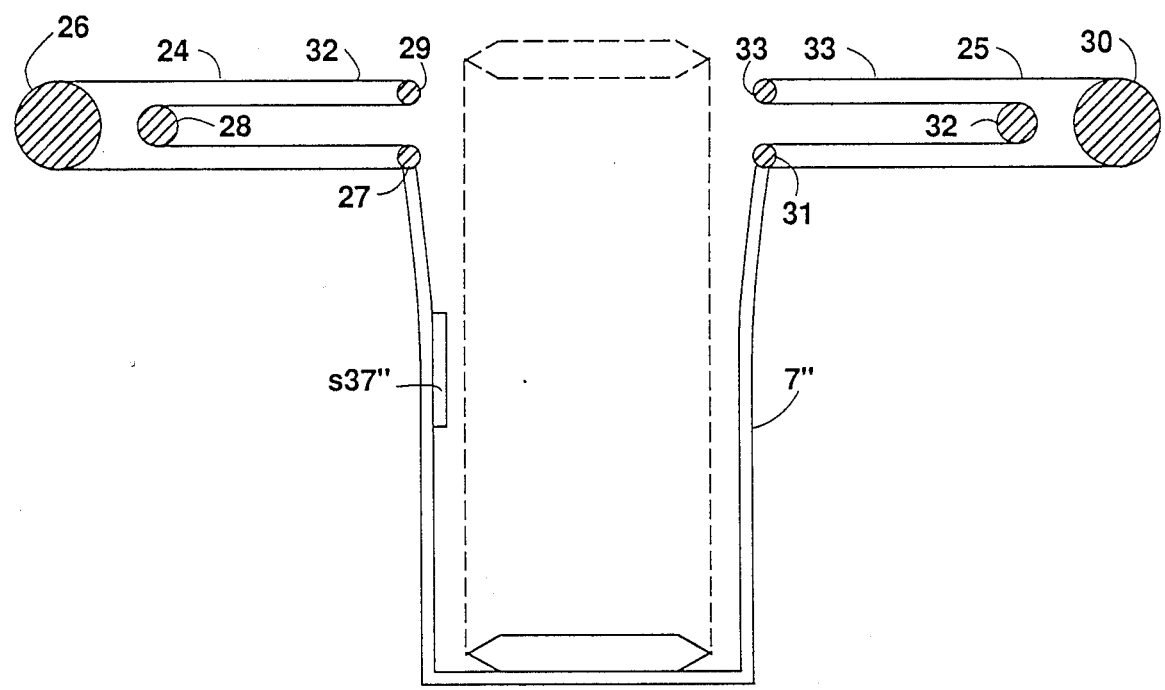

In another embodiment of the invention an automatic baler for bundling together individual food bags or similars is made as per the preferred and alternative embodiments previously described herein, except that, as shown in FIGS. 14 and 15, the hopper 7" has its upper side covered with a different type of removable surface for constituting the station 8". A pair of modifiable endless bands 24-25 rotateable supported on respective pulley sets 26-29 and 30-33 in such a way that their configurations are modifiable to alternatively constitute a surface closing the upper side of the hopper 7", as seen in FIG. 14 conforming in this way the station 8" in which a layer of packages is clustered in accordance with the preferred embodiment before described or a layer of packages previously clustered in the intermediate station 17 is skiddingly and laterally pushed from station 8' as per the alternative embodiment also described, and later to leave it freely opened so that the layer of packages at any given moment present in the station 8" will be allowed to drop into the stacking hopper 7".

Every set of pulleys 26-29 and 30-33 is provided with respective driven pulleys 28 and 32 and idle pulleys 29 and 33 all of them having their shafts mounted in rack and pinions (not shown) in order to be moveable in lateral and parallel fashion between a closed position and an open position. The pulleys 26-27 and 30-31 have their shafts in rotatable fixed form.

When a group of packages have been stacked upon the station 8" defined by the two adjoining and coplanar portions 32 and 33 of the endless bands 24 and 25 which at that moment are covering or closing the upper side of the hopper 7", as seen in FIG. 14, and a sensor S37 determinates that said upper side should be opened so that the layer of packages can fall into the hopper 7" to form part of a forming bale therein, the driven pulleys are activated in any known way sot that they will run laterally in opposite directions dragging consequently in same and parallel path the idle pulleys 29 and 33 causing that the coplanar upper portions 32 and 33 of the endless bands 24 and 25 be displaced in opposite directions to the open positions shown in FIG. 15 conforming now respective parallel planes with the rest portions of the bands, leaving the upper side of the hopper 7" totally free for which reason the packages drop into it, as seen in FIG. 15.

The invention is only limited as by the following claims but it is recognized that various modifications are possible within the scope of the claims.

What is claimed is:

1. An automatic baler for bundling together packages previously filled, closed and sealed in a packer machine, comprising:

an endless conveyor constituting an inlet of said automatic baler, said endless conveyor operatively associated with an outlet of a packer machine in such a way that every new package therein formed is fed upon a moving surface of said conveyor;

a first station comprising a first pneumatic cylinder and a first sensor, said first station being disposed at an end of said endless conveyor in such a way that each of said packages, upon arrival at said first station is stopped and detected by said sensor and subsequently pushed by said first pneumatic cylinder in a lateral movement toward a second station;

said second station comprising a stacking hopper having a top side upon which said packages displaced from said first station by said first pnuematic cylinder are disposed side by side to constitute a layer of packages, said top side of said stacking hopper comprising a pair of endless bands of modifiable configuration, rotatably supported on respective pulley sets in such a way that said configurations are modifiable between a closed position and an open position such that when taken to said closed position said endless bands adjoin in coplanar relationship over said stacking hopper thereby closing said stacking hopper and constituting at the same time said second station for receiving said packages, and when taken to said open position, said endless bands are laterally separated in opposite directions leave open said stacking hopper allowing said packages grouped at said second station to drop downwardly into said stacking hopper, each of said endless bands being associated with a set of pulleys comprising a driven pulley, a fixed idle pulley, and a pair of moveable idle pulleys, said driven pulley and said fixed idle pulley having shafts mounted in rotatable fixed form and said pair of moveable idle pulleys having shafts mounted in rack and pinion form so as to be moveable in lateral, parallel, and opposite fashion between said closed position and said open position, said top side of said stacking hopper having a second sensor such that when said second sensor determines that a predeterminate number of said packages have been therein grouped said second senosr will activate said top side of said stacking hopper to separate said endless bands leaving open said top side of said stacking hopper in order that said layer of packages drops freely downward into said stacking hopper;

an extension of said stacking hopper defining a rear projecting mouth for receiving a mouth of bigger bag, said projecting mouth having therein associated a bag opener comprising a flat surface conforming to an upper moveable side of said rear projecting mouth capable of being moved in a vertical fashion driven by a second pneumatic cylinder between a lower position and an upper position, in such a way that when taken to said lower position said flat surface rests upon said upper side of said rear projecting mouth thereby reducing said rear projecting mouth in size so as to allow an operator to install said bigger bag, by surrounding a rear side of said rear projecting mouth with said mouth of said bigger bag, and when taken to said upper position said mouth of said bigger bag is displaced to an open condition readying said bigger bag to receive a stacking of said layers of packages integrated together by said stacking hopper;

a third pneumatic cylinder disposed in association with said stacking hopper having a piston and a flat pusher on a distal end of said piston so as to be moveble in a path longitudinal to said stacking hopper when a third sensor determines that a predeterminate stack of said layers of packages has been formed in said stacking hopper, pushing in skidding fashion said stack of layers into said bigger bag while said flat surface keeps said mouth of said bigger bag open; said second pneumatic cylinder being operable to lower again said flat surface to a resting position upon said upper side of said projecting mouth freeing said mouth of said bigger bag in order that an operator can proceed to withdraw said bigger bag for later or consequently closing or sealing said bigger bag in any known manner.

2. The automatic baler for bundling together packages as claimed in claim 1, wherein said baler additionally comprises an intermediate station disposed between said first station and said second station in order that said packages being transferred from said first station be clustered together side by side on said intermediate station until a layer of said packages if formed, a fourth sensor being associated with said intermediate station to detect when said layer of packages has been formed and thereafter activate a displacer means to push said layer of packages laterally toward said second station, said second sensor assocated with said second station, upon detecting said layer of packages, thereupon opening said top side of said stacking hopper to let said layer of packages drop into said stacking hopper; said displacer means comprising an articulated arm having a flat pusher disposed at a right angle at a free end, said articulated arm being basculeable between a raised position and a lowered position by means of a fourth pneumatic cylinder, in said raised position said articulated arm allowing passage thereneath of said packages being fed by said endless conveyer to said first station as well as said packages being pushed from said first station toward said intermediate station and in said lowered position said articulated arm allowing passage os said packages being fed by said endless conveyor to said first station and having said flat pusher aligned in parallel with a last package pushed and disposed upon said intermediate station and being able to displacement in said lowered position in lateral fashion in order to push said layer of packages formed upon said intermediate station toward said station.

* * * * *